United States Patent [19]

Ichikawa et al.

[11] 3,881,069

[45] Apr. 29, 1975

[54] TELEPHONE CALL LOUDSPEAKER MONITORING AND RELAY CONTROL CIRCUIT

[75] Inventors: Mihikiro Ichikawa, Kawasaki; Kazuyuki Gotoh, Kunitachi, Tokyo, both of Japan; Stephen E. Kerman, Merrick, N.Y.

[73] Assignees: Nippon Tsu Shin Kogyo, K.K., Kawasaki, Kanagawa-ken, Japan; TIE/Communications, Inc., Stamford, Conn.

[22] Filed: Apr. 5, 1973

[21] Appl. No.: 348,286

[52] U.S. Cl. .............................................. 179/81 B

[51] Int. Cl. .............................................. H04m 1/60

[58] Field of Search ............ 179/81 B, 100 L, 90 B, 179/2 DP, 6 R, 6 E, 1 HF; 317/148.5 R; 328/59; 307/215, 247 A

[56] References Cited

UNITED STATES PATENTS

| | | | |
|---|---|---|---|
| 3,155,947 | 11/1964 | Yoshida | 307/215 |
| 3,662,118 | 5/1972 | Phoenix | 179/90 B |
| 3,730,997 | 5/1973 | Konno | 179/6 |

*Primary Examiner*—Kathleen H. Claffy
*Assistant Examiner*—Joseph Popek
*Attorney, Agent, or Firm*—Kenyon & Kenyon

[57] ABSTRACT

A telephone call loudspeaker monitoring circuit is disclosed in which a transistor switching circuit is used to operate a relay to connect and disconnect the monitoring circuit as desired. The switching circuit is controlled by an R–S flip-flop circuit formed from two inverters. A third inverter is used in conjunction with a relay contact as the input for the R–S flip-flop circuit. By the circuit, the monitoring function can be started and stopped in response to a number of different signals from the telephone set.

9 Claims, 2 Drawing Figures

TELEPHONE CALL LOUDSPEAKER MONITORING AND RELAY CONTROL CIRCUIT

BACKGROUND OF THE INVENTION

The present invention relates in general to relay operating circuits and more particularly to a relay operating circuit which may be operated in response to either a hookswitch or key switch contact in a telephone set, to permit an amplifier and loudspeaker contained in the telephone set to be connected to or disconnected from the transmission network of the telephone set so as to permit loudspeaker monitoring in addition to or instead of conventional handset monitoring of audio signals on the line.

The circuit permits speaker monitoring to be either started or stopped by alternate operations of a single nonlocking key switch, or stopped in response to certain hookswitch signals hereinafter described.

In prior circuits used to operate relays in this manner, one approach was to apply voltage directly to the relay, whereas an alternative was to indirectly apply the voltage through a semiconductor circuit used to control the relay. With semiconductors, it is possible to drive relays in a number of different ways depending on the circuits involved.

In general the semiconductor devices used are transistors, TTL, DTL or MOS IC's. These devices have various advantages and disadvantages depending on the requirements of the circuit, such as the operating voltage, the input signal strength and the cost.

In circuits using only transistors to perform binary operations with one input signal, it is necessary to assemble complicated flip-flop circuits at high cost. In cases using TTL and DTL circuits, because there are differences between the integrated circuit and relay voltages, ordinary 24 volt relays commonly used in telephone systems cannot be used. This presents additional problems in powering the circuit.

The object of the present invention therefore is to overcome the problems of the prior art with a relay driving circuit using transistors and an MOS IC at 24 volts, commonly available in telephone systems. To accomplish this an R–S flip-flop circuit (hereafter abbreviated as R–S FF) comprising two inverters is used. By the circuit construction of this invention it may be used to drive a conventional 24 volt relay, performing binary operations through a single input signal, the nonlocking key.

BRIEF DESCRIPTION OF THE DRAWINGS

The invention, as well as its objects and features, will be better understood by reference to the following detailed description of the preferred embodiment of this invention when considered together with the accompanying drawings in which.

DETAILED DESCRIPTION OF THE PREFERRED EMBODIMENT

Figure 1:
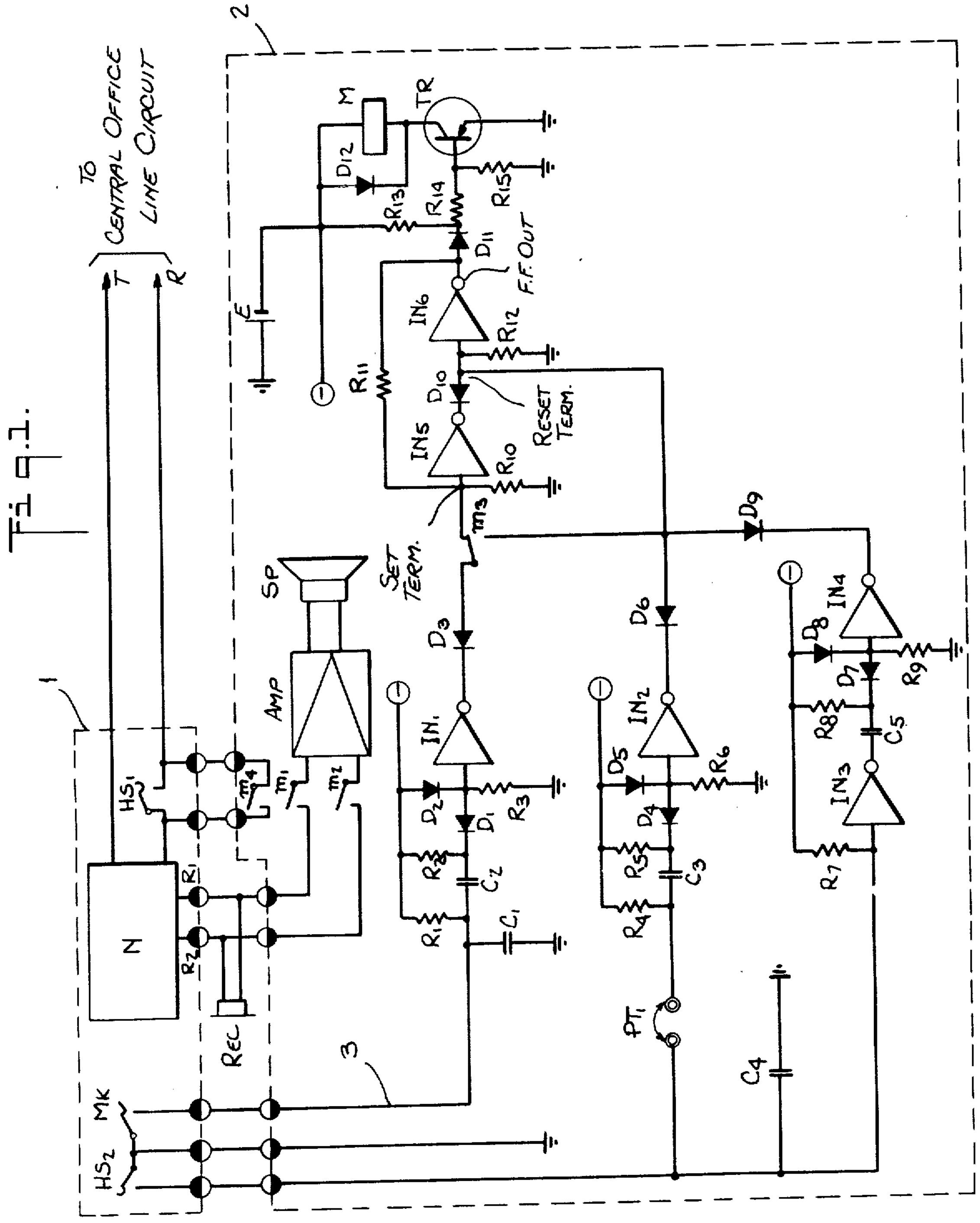
FIG. 1 is a schematic circuit diagram of the preferred embodiment for carrying out this invention.

In FIG. 1, a telephone set is indicated by the dashed line 1. A standard telephone network N, within the telephone, has two hookswitch contacts HS1 and HS2. A nonlocking type monitor key switch MK is mounted, for example, on the front panel of the telephone. Lines T and R connect to the telephone central office. The circuit of this invention is surrounded by dashed lines 2, and includes the circuit controling the binary operation of relay M. Speaker SP and amplifier AMP mounted within the circuit 2 are for monitoring the call. Ordinary resistors R1 to R15, capacitors C1 to C15, and diodes D1 to D11 are provided with their functions explained in greater detail infra. Inverters IN1 through IN6 are of MOS IC construction with their gate terminals connected to the control signal circuit, their source terminals connected to ground (zero voltage), and their drain terminals, through load resistors, connected to the negative voltage terminal of the power source E. In operation in the circuit, a voltage is fed to the gates of the inverters turning the inverters on and driving their outputs to a zero voltage level. If the gating input is less than a predetermined "on" level, the inverters are cut off and their output is at the negative voltage of E.

The transistor, TR, is a common PNP type transistor, used as a relay driver. A standard 24 volt M type relay is used and its contacts are shown as make contacts *m*1, *m*2 and *m*4, and transfer contact *m*3.

During the operation of the circuit an audio voice signal, from the telephone network 1 receiver circuit R1 and R2 is applied as an input to amplifier AMP through the make contacts *m*1 and *m*2, and monitored through speaker SP. Contact *m*4 operates whether or not hookswitch contact HS1 is closed, i.e., whether or not the telephone handset is lifted. Thus when hookswitch HS1 is open and the handset is not raised, contact *m*4 makes and the network circuit N operates as if the handset were raised, and hookswitch contact HS1 closed. PT1 is a jumper connection between terminals. Jumper PT determines whether or not the relay will be switched from the operated to the released state when hookswitch contact HS2 makes.

The detailed operation of the circuit of the present invention will now be explained by reference to FIGS. 1 and 2.

Initially, when a call is to be made through the central office over circuit T and R, the user lifts the handset of the telephone, hookswitch contacts HS1 and HS2 close, connecting leads T and R to telephone network N permitting the telephone set to operate in the conventional manner. The central office line is thereby seized, dial tone is heard in the handset, and dialling may now occur.

The MK key (not shown) can be operated closing the MK contact instead of lifting the handset. In response to this relay M operates as is hereinafter described. The *m*4 contact closes, completing a circuit from the R lead to the network N, thereby seizing the central office line and preparing the network for dialling in the same manner as the closing of hookswitch contact HS1. The *m*1 and *m*2 contacts connect the amplifier input across the receiver leads R1 and R2 of the network N so that audio signals received on the T and R leads, such as dial tone, will be reproduced by the loudspeaker SP. Dialling can then proceed.

The operation of MK applies ground to lead 3 and charges capacitor C2 through resistor R2. The negative voltage previously applied to the gate of inverter IN1 through resistor R2 and diode D1 is shunted down by the charging of C2. As a result inverter IN1 is turned off momentarily and its output voltage rises from zero to a negative voltage –E.

As capacitor C2 becomes charged, the gate voltage at inverter IN1 rises to a negative value and inverter IN1 is turned on with its output returning to zero. The output of IN1 is, therefore, a pulse of voltage –E and width *t*1 shown by curve (b) of FIG. 2, while operation of the key MK is shown by curve (a). When monitor key MK is pushed and MK makes, the output of inverter IN1 is a negative pulse of duration *t*1. Should monitor key MK be held longer than time *t*1, the duration of the pulse will not change because *t*1 is determined solely by the time constant of capacitor C2 and resistor R2.

When monitor key MK is released, contact MK breaks, and capacitor C2 is discharged through resistors R1 and R2 and then recharges in the opposite direction through resistors R1 and R3 and diode D1, returning to its previous state. As a result each time monitor key MK is pressed and contact MK makes, the output of inverter IN1 is a negative pulse of –E volts and time span *t*1.

The R–S FF circuit is constructed from inverters IN5 and IN6, with the inverter IN5 input the "set" terminal, the input to inverter IN6 the "reset" terminal, and the output of inverter IN6 the "FF" output. The "set" condition is defined as the period when inverter IN5 is "on", and inverter IN6 is "off", i.e., when the output is –E volts. The "reset" condition occurs when inverter IN5 is "off" and inverter IN6 is "on", or in other words when the output is zero volts. The R–S FF is normally left in the "reset" state.

When the –E volt pulse of time span *t*1, produced at the inverter IN1 output terminal by pressing monitor key MK enters the "set" terminal, inverter IN5 is turned "on". Inverter IN5 turning "on", turns "off" inverter IN6 and its output becomes –E volts. The –E volt output of IN6 is fed back through resistor R11 to the input of inverter IN5, keeping IN5 turned "on" and thereby keeping the R–S FF in a "set" condition even after the output from IN1 returns to zero volts at the end of time *t*1.

When the R–S FF is "set" and its output becomes negative, transistor TR of the relay driver circuit is turned on, current flows through the coil of relay M, relay M operates, and contacts *m*1 to *m*4 operate. Thus relay M operates with FF in the "set" state. In FIG. 1, FF is shown in the reset state, and therefore contacts *m*1 to *m*4 are released.

When the FF is "set" by the output pulse from inverter IN1, relay M operates, contact *m*3 transfers and the output terminal of inverter IN1 is connected to the "reset" terminal of the FF.

If the "reset" input to inverter IN6 becomes –E volts, while the FF is in the "set" condition, inverter IN6 will go on and its output will become zero. Because there will then be no minus voltage at the input to inverter IN5, it will be turned off and supply –E volts to the input of inverter IN6, which will keep the FF in the "reset" state.

Figure 2:
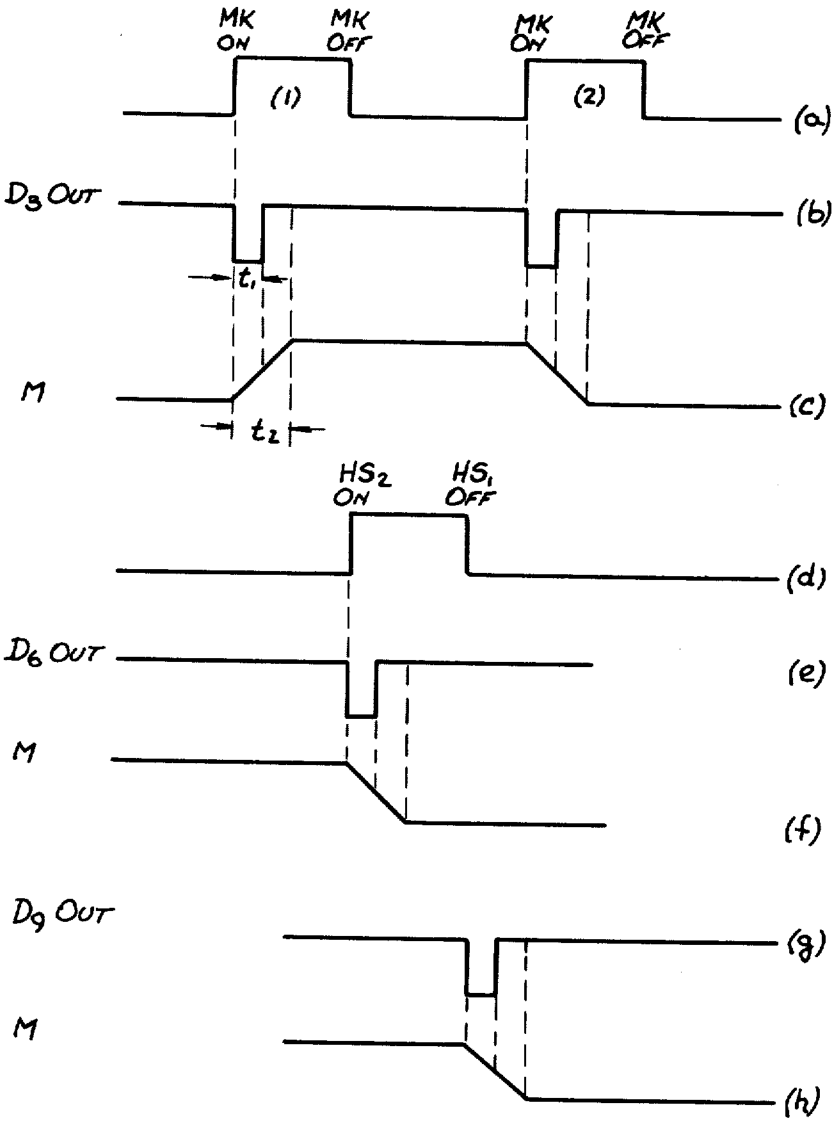
FIG. 2 is a graph illustrating the voltage waveforms produced in the circuit plotted against time.

FIG. 2 (c) is curve illustrating the operation of relay M, designed to operate in the time span, *t*2, longer than the output time span *t*1 of inverter IN1. If the operate time *t*2 of relay M is less than or equal to time *t*1, the set pulse will be applied first to the "set" terminal and then to the reset terminal upon the operation of contact *m*3 thereby preventing the circuit's proper operation. Therefore, it is necessary for the values of resistor R2 and capacitor C2 to be such that $t1 < t2$.

When this condition is satisfied and monitor key MK is pushed, relay M operates, and contacts *m*1 to *m*4 make. With this condition, because contacts *m*1 and *m*2 are made, the audio signals from the leads T and R enter amplifier AMP via network N and are monitored at speaker SP. When monitor key MK is pushed a second time, a second pulse shown as (2) on curve (a) is generated which appears at the reset terminal of FF as described previously, FF returns to its reset condition and relay M is released. This is shown in the curve of FIG. 2(c).

FIG. 2 curves (d), (e), (f), (g) and (h) illustrate the operation of the circuit in response to hookswitch contact HS2. Since the operation of the inverters IN2, IN3 and IN4 is identical to what was described above for the operation of monitor switch MK, the details will be omitted.

When HS2 closes, if jumper PT1 is connected, a reset pulse will be generated by IN2, releasing thereby relay M so that a connection established by dialling with the handset on hook can be transferred to the handset for two-way conversation merely by lifting the handset. Monitoring may be restarted while the handset is in use by pressing the MK key once more after lifting the handset.

On the other hand, when the handset is replaced after use, IN3 and IN4 generate a reset pulse to once again turn-off transistor TR and release M, so that the call may be easily terminated.

If jumper PT1 is omitted, the closing of contact HS2 will not generate a reset pulse and the monitoring circuit, if "on", will stay on until the HS2 contacts opens and the IN3 and IN4 inverters generate a reset pulse to turn it "off".

As described above, the present invention enables relay M to be alternately operated and released by the connection of the switching contact *m*3 of relay M at the input terminals of the R–S FF circuit, alternately changing its connection between the set and the reset terminals of the FF circuit each time a single pulse enters the input terminal at contact *m*3. Thus, by means of the present invention it is possible to produce a relay drive circuit capable of imparting binary operation to a relay simply by an assembly of an FF circuit and a single relay contact without requiring a complex circuit.

It is to be understood that the embodiment of the invention described herein is merely intended to illustrate the operative principles of the invention and is not considered as limiting the scope of the invention. Modifications may be made by those skilled in the art without departing from the spirit of the invention.

What is claimed is:

1. A relay operating circuit comprising a means for generating a first and second pulse of fixed duration, said second pulse occurring after at least a predetermined time delay;

a first inverting circuit means selectively connected to the output of the pulse generating means for producing a first inverted output pulse in response to the first pulse of fixed duration from the pulse generating means;

a second inverting circuit means connected to the output of the first inverting means for producing an output signal in response to the output pulse from the first inverter means, the second inverter means output having the same polarity as the first pulse at the input of the first inverting means;

feedback means connected between the output of the second inverting means and the input of the first inverting means for holding the output of the second inverting means at the level to which it is set by the first inverted output pulse from the first inverting means after the termination of the output pulse from the first inverting circuit;

means, connected to the second inverting means, responsive to the output of the second inverting means, for operating a relay; and relay contact means connected between the pulse generating means and the first and second inverting means, said contacts responsive to the operation of the relay for selectively disconnecting the input of the first inverting means from the output of the pulse generating means and connecting the second pulse of fixed duration from the pulse generating means to the input of the second inverting means, said pulse resetting said second inverter means to produce an output signal releasing said relay, and thereby reconnecting the output of the pulse generating means to the first inverting circuit.

2. A relay operating circuit as in claim 1 in which the means for generating pulses of fixed duration comprises an inverter means operated in response to the closure of an input key contact.

3. A relay operating circuit as in claim 2, further comprising a second and third means for generating pulses of fixed duration in response to the opening of a second input key contact, said second and third means being connected in parallel as inputs to said second inverting means.

4. A relay operating circuit as in claim 1 wherein the inverting means and pulse generating means comprise MOS integrated circuits powered from a voltage source used to operate the relay and having an operating voltage conventional to telephone systems.

5. A relay operating circuit as in claim 3 wherein;

a first means for generating a first and second pulse of fixed duration has an input connected to a non-locking key switch in a telephone set, and;

the second and third pulse generating means have a common input connected to a contact on the hookswitch of a telephone set.

6. A relay operating circuit as in claim 1 wherein;

the relay is used to connect and disconnect a loudspeaker and amplifier from a line circuit means of a telephone to thereby permit outgoing dialling through the loudspeaker while a handset remains on-hook.

7. A relay operating circuit as in claim 3 wherein the time duration of the output pulse of the three pulse generating means is determined by the time constants of R–C networks connected to the inputs of inverters and the time constants are less than the operate and release time of the relay.

8. In a telephone system having a line circuit means and at least one telephone set with a loudspeaker and amplifier means, means for connecting the telephone set to the line circuit means comprising;

a non-locking key contact and a hookswitch contact connected between the telephone set and the line circuit means means responsive to successive operations of the non-locking key contact for alternately operating and releasing a relay to connect and disconnect the loudspeaker and amplifier from the line circuit means of the telephone system thereby permitting outgoing dialling and monitoring of calls from the telephone set without removing a handset and releasing the hookswitch; and means responsive to the operation of the hookswitch contact for releasing the relay to disconnect the loudspeaker and amplifier from the line circuit means of said telephone system.

9. In a telephone system as in claim 8 wherein the means responsive to the successive operations of the non-locking key contact comprises a means responsive to the successive operations of the non-locking key contact for generating a first and second pulse of fixed duration, said second pulse occurring after at least a predetermined time delay;

a first inverting circuit means selectively connected to the output of the pulse generating means for producing a first inverted output pulse in response to the first pulse of fixed duration from the pulse generating means;

a second inverting circuit means connected to the output of the first inverting means for producing an output signal in response to the output pulse from the first inverter means, the second inverter means output having the same polarity as the first pulse of fixed duration to the first inverting means;

feedback means connected between the output of the second inverting means and the input of the first inverting means for holding the output of the second inverting means at the level to which it is set by the first inverted output pulse from the first inverting means after the termination of the output pulse from the first inverting circuit;

means, connected to the second inverting means, responsive to the output of the second inverting means, for operating a relay; and relay contact means responsive to the operation of the relay for selectively disconnecting the input of the first inverting means from the output of the pulse generating means and connecting the second pulse of fixed duration from the pulse generating means to the input of the second inverting means, said pulse resetting said second inverter means to produce an output signal releasing said relay, and thereby reconnecting the output of the pulse generating means to the first inverting circuit.

* * * * *